Patented July 13, 1954

2,683,665

UNITED STATES PATENT OFFICE 2,683,665

PROCESS OF MAKING GRATED CHEESE

Edwin Traisman, Des Plaines, and Wallace Kurtzhalts, Wheeling, Ill., assignors to Kraft Foods Company, Chicago, Ill., a corporation of Delaware No Drawing. Application October 4, 1951,
Serial No. 249,798

7 Claims. (Cl. 99—117)

The present invention relates in general to a method of making grated or comminuted cheeses and more particularly, to a method of making a grated cheese of the high-fat type wherein all of the constituents are comminuted cheese particles, the finished grated cheese being resistant to caking or agglomeration under ordinary atmospheric conditions.

The term high-fat type cheese, as used herein, shall refer to cheeses having in excess of 40 per cent milk fat, on a dry basis, and includes such cheeses as American cheese, Swiss cheese, Edam cheese, Blue cheese and Gouda cheese. The term "American" cheese is commonly used to denote cheeses which have the characteristics of Cheddar cheese made by either the stirred curd or milled curd process. American cheeses include, in addition to Cheddar cheeses, Colby cheese and washed curd cheese. In the following discussion, the term "American" will be used in this broadly defined sense.

When high-fat cheese, as for example, natural American cheese, which ordinarily contains at least 50 per cent milk fat on a dry basis, is stored at temperatures above about 85° F. at normal humidity or at even lower temperatures when the humidity is high, a portion of the milk fat in the cheese tends to separate from the protein and other constituents of the cheese. This separation is known in the art as "oiling" or "oiling off" and causes the surface of the cheese to become covered with a thin layer of milk fat. This characteristic action has made the storage and distribution of grated or comminuted cheeses of this type very difficult since the presence of the milk fat on the surface of the cheese particles causes the particles to adhere to each other, thereby resulting in agglomeration or caking which prevents the effective use of a shaker top dispenser. Furthermore, oiling results in oxidation of the fat on the surface of the cheese so that the cheese receives a tallowy flavor which is undesirable. A still further disadvantage of the oiling characteristic is that it causes the fiber board containers, in which grated cheese is usually marketed, to become unsightly. This results from absorption of the milk fat by the fiber board so that the containers have oily spots which tend to pick up dirt, etc.

The known method for minimizing the undesirable features mentioned above involves dusting the surface of the cheese with an inert, substantially fat-free substance such as skim milk powder to provide an absorbent for surface fat on the cheese and to form a dry protective layer over the cheese particles. In order to prevent caking effectively, large amounts of the inert substances are employed, e. g., up to 70 per cent of the weight of the final grated product. Grated high-fat cheese made in this manner can be stored for reasonable periods of time without appreciable caking, but because of the large amounts of inert substances required, the cheese flavor of the product is weak and in some extreme instances is practically non-existent. In addition, the known grated cheeses which have been dusted with inert substances are particularly susceptible to darkening or browning in storage.

The principal object of the present invention is to produce grated high-fat type cheeses which will not lump or cake and which will not darken during storage and in which a large portion of the cheese is high-fat type cheese and all of the constituents of the final product consist of cheese. Other objects and advantages of the invention will become known by reference to the following description.

We have discovered that by treating a portion of the high-fat type cheese in the final grated cheese product in a specific manner and then after the treated portion of the cheese is mixed with the untreated portion, conditioning or tempering the mixture, a grated cheese product may be made which will not lump or cake. Our improved cheese product is made from a mixture of high-fat type cheese, one portion of which is a processed, dried cheese, in particle form, and the other portion of which is a natural comminuted cheese which has been dried at a temperature at which the fat in the natural cheese will not oil off. The natural cheese may be dried either before or after comminution. After drying and comminution, the natural cheese is mixed with the dried process cheese and the entire mixture is then tempered at a relatively low humidity and a temperature at which the natural cheese will oil off. This tempering treatment is continued for a sufficient length of time to cause the fats in the cheeses to become stabilized in such a manner that they will not oil off to cause caking, lumping, or undesired flavoring of the final product. The tempered mixture may then be placed in shaker type cans and stored under normal atmospheric conditions for extended periods of time.

Preferably, in the practice of our invention a high-fat natural cheese is first dried to a moisture content of between about 10 and 15 per cent by weight at a temperature which is below the oiling off point of the cheese. The temperature of drying is preferably below about 80° F. Either before or after the drying procedure, the cheese is comminuted to the desired size. Any of the known types of grating or comminuting mechanisms may be employed. We have obtained good results by first slicing a natural cheese into extremely thin slices and then milling the cheese in a tumbling mill to obtain the desired sized particles. Another method of comminution which has been employed with success has involved comminuting cheese which is in a chilled condition.

The process cheese constituent of our grated cheese mixture is preferably made from the natural cheese with which the process cheese is to mixed. However, other natural cheese may be employed with a corresponding change in the product. The natural cheese, which is to be converted to process cheese, is heated to pasteurizing temperatures with added emulsifier and dried by any suitable procedure, e. g., by spray drying in a blast of hot air in the normal manner, to produce a dried cheese containing between about 2 and 3 per cent moisture. This dried cheese may be finely comminuted either during or after the drying procedure. Spray drying is the most satisfactory procedure for drying the processed cheese since it produces fine, uniform-sized particles. The drying procedure impairs the flavor of the cheese somewhat, but the cheese still retains a good cheese flavor.

A sufficient amount of the dried process cheese, which contains between about 2 and 3 per cent moisture by weight, is mixed with the dried natural cheese, which contains between about 10 and 15 per cent moisture, to provide a product which, after a tempering or conditioning operation, will render the dried natural cheese substantially non-caking. We have found that the amount of process cheese should amount to about 40 to 70 per cent of the weight of the final grated cheese product to minimize caking or agglomeration and other undesired characteristics of the finished product.

The mixture of dried natural and process cheeses is then tempered or conditioned under controlled temperature and humidity conditions to provide the non-caking product of the invention. This conditioning involves placing the mixture in an atmosphere having a low relative humidity, e. g., about 40 per cent or less, and at a temperature at which the natural cheese will oil off, e. g., a temperature of over about 80° F. The temperature, however, should not exceed about 200° F. if satisfactory results are to be obtained. The mixture is maintained under these conditions for a sufficient length of time to become conditioned, i. e., to change the characteristics of the cheese so it will not oil upon standing under ordinary atmospheric conditions. This tempering operation may require from 15 minutes to 54 hours depending upon temperature and humidity employed, the time of treatment being inversely proportional to temperature.

After the tempering or conditioning operation, the cheese may be screened and then packaged in suitable containers for distribution. The resulting product will keep well under normal unrefrigerated storage conditions and will retain a good cheese flavor.

*Example*

High quality natural American Cheddar cheese containing 36 per cent moisture and 34 per cent milk fat is first comminuted by slicing the cheese into slices about 1/32 inch thick. The sliced natural cheese is then air dried at a temperature of about 70° F. until the cheese contains between about 10 and 15 per cent by weight of moisture. The dried sliced cheese is then milled at a temperature of 70° F. which is below the oiling off point of the cheese until the particle size of the comminuted cheese is about 15 mesh. In the alternative, the cheese can be grated while in a chilled condition and then dried.

Another portion of the high quality natural American Cheddar cheese is then melted with about 1 per cent of sodium phosphate emulsifier and is heated to a temperature of about 200° F. and then spray dried in a stream of air which is maintained at about 300° F. The spray drying process transforms the original American cheese to a powdered form containing about 2 to 3 per cent moisture and of a particle size of about 50 mesh. The heating and the addition of sodium phosphate emulsifier so conditions the milk fats that they are substantially inseparable from the protein and other cheese constituents at ordinary temperatures.

About 50 parts by weight of the finely divided particles of natural American Cheddar cheese, which contains 10 to 15 per cent moisture, are then mixed with 50 parts by weight of the spray dried American Cheddar cheese which contains 2 to 3 per cent moisture.

The mixture is then tempered or conditioned by being maintained at a temperature of about 98° F. and at a relative humidity of about 40 per cent for 48 hours. This holding period under controlled conditions and temperatures conditions the cheese so that it becomes resistant to caking. During the tempering step, the mixture, which contains between about 6 and 9 per cent moisture by weight, loses about 2 to 4 per cent of its moisture content so that by the end of the tempering period the mixture contains about 4 to 5 per cent by weight of moisture.

As an alternative procedure, the mixed cheese is tempered in a tumbler type drier. The air is introduced into the drier at 150° F. and at a relative humidity of about 9 per cent while the mixture is tumbled. Tempering is satisfactorily completed in 30 minutes and the tempered mixture contains between 4 and 5 per cent by weight of moisture.

After the tempering period is completed, the tempered cheese mixture is screened, dry mixed and packed in containers. Grated cheese made by this process has a pleasing full cheese flavor and can be stored for six months at a temperature of 85° F. and a relative humidity of 60 per cent without appreciable lumping or caking. Moreover, the finished product shows little, if any, tendency to darken even when stored under adverse conditions.

Various features of the present invention which are believed to be new are set forth in the appended claims.

We claim:

1. A method of making grated high-fat cheese comprising the steps of mixing dried natural high-fat cheese in comminuted form with finely divided particles of dried, process high-fat cheese, and tempering the mixture under controlled temperature and humidity conditions to provide a non-caking product.

2. A method of making grated high-fat cheese comprising the steps of mixing dried natural high-fat cheese in comminuted form with finely divided particles of dried, process high-fat cheese and tempering the mixture at a temperature above the oiling off point of natural high-fat cheese and at a low relative humidity for a sufficient period of time to condition the cheese in such manner that it becomes resistant to caking.

3. A method of making grated high-fat cheese comprising the steps of mixing dried natural high-fat cheese in comminuted form with finely divided particles of dried, process high-fat cheese and tempering the mixture at a temperature above the oiling off point of natural high-fat cheese and at a relative humidity of below about 40 per cent for from 15 minutes to 54 hours to condition the cheese in such manner that it becomes resistant to caking.

4. A method of making grated high-fat cheese comprising the steps of mixing dried natural high-fat cheese in comminuted form with finely divided particles of dried, process high-fat cheese and tempering the mixture at a temperature between about 80° F. and about 200° F. and at a relative humidity below about 40 per cent for from 15 minutes to 54 hours to condition the cheese in such manner that it becomes resistant to caking, the time of tempering being inversely proportional to the temperature at which tempering is accomplished.

5. A method of making grated American cheese comprising the steps of mixing dried natural American cheese in comminuted form with finely divided particles of dried, process American cheese and tempering the mixture at a temperature of about 98° F. and at a relative humidity of below about 40 per cent for from 36 to 54 hours to condition the cheese in such manner that it becomes resistant to caking.

6. A method of making grated high-fat cheese comprising the steps of comminuting natural high-fat cheese to a finely divided state, drying the finely divided particles of natural high-fat cheese at a temperature below the "oiling" point of the cheese until the particles contain 10–15 per cent by weight of moisture, mixing said finely divided particles of natural cheese with an amount of finely divided, dried process high-fat cheese sufficient to provide a content of process cheese in the final product of 40 to 70 percent by weight, said process cheese having a moisture content of from about 2 to 3 per cent, tempering the mixture of natural and processed cheese particles by maintaining said mixture at a temperature above the "oiling" point of the natural high-fat cheese and at a relative humidity of less than about 40 per cent for from 15 minutes to 54 hours, screening the tempered mixture and packaging the screened material.

7. The method of making grated American cheese comprising the steps of comminuting natural American cheese to a finely divided state, drying the finely divided particles of natural American cheese at a temperature below the "oiling" point of the cheese until the particles contain 10–15 per cent by weight of moisture content, mixing said finely divided particles of natural cheese with 40–70 per cent by weight of powdered spray-dried process American cheese having a moisture content of from about 2 to 3 per cent, tempering the mixture of natural and processed cheese particles by maintaining said mixture at a temperature between about 80° F. and 200° F. and at a relative humidity of below 40 per cent for from 15 minutes to 48 hours, the time of tempering being inversely proportional to the temperature at which tempering is accomplished, screening said tempered mixture, and packaging the screened material.

References Cited in the file of this patent

UNITED STATES PATENTS

| Number | Name | Date |
|---|---|---|
| 1,737,770 | Parsons | Dec. 3, 1929 |
| 1,918,595 | Frederiksen | July 18, 1933 |
| 1,997,866 | Irvin | Apr. 16, 1935 |